Sept. 17, 1968  W. E. BURNS  3,401,482
FISHING ROD
Filed Oct. 21, 1965
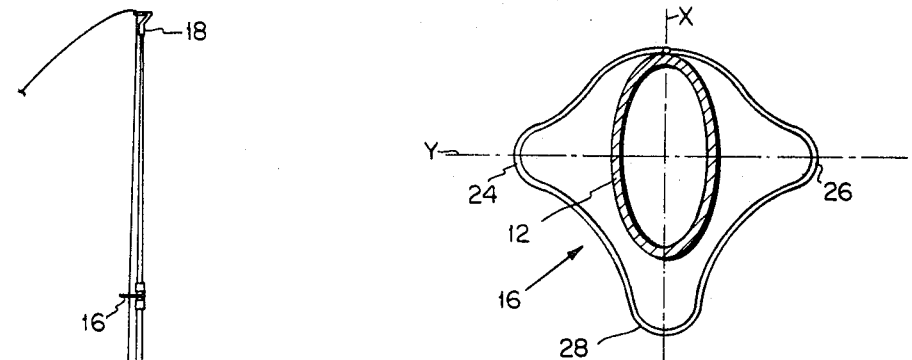
FIG. 2
FIG. 3
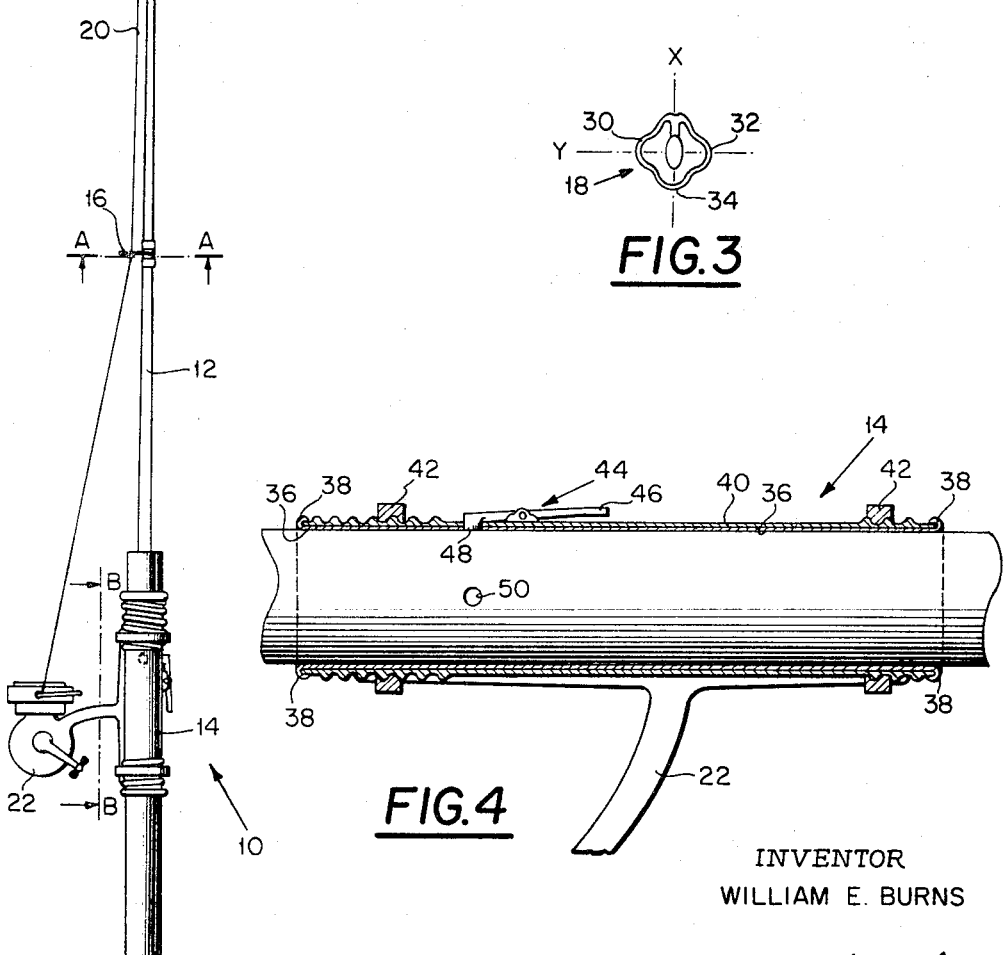
FIG. 4
FIG. 1
INVENTOR
WILLIAM E. BURNS
By *Otto Schmid, Jr.*
ATTORNEY

United States Patent Office

3,401,482
Patented Sept. 17, 1968

3,401,482
FISHING ROD
William E. Burns, 18641 Oak Drive,
Monte Sereno, Calif. 95030
Filed Oct. 21, 1965, Ser. No. 499,965
4 Claims. (Cl. 43—22)

ABSTRACT OF THE DISCLOSURE

A fishing rod having different flexural characteristics and a plurality of axes of symmetry, and whose line guides are symmetrically shaped to provide inwardly curved sections between line guide portions, the guide portions being positioned symmetrically with the axes of symmetry of the fishing rod. In addition the reel seat is selectively rotatable circumferentially about the handle to allow adjustment of the reel to the desired symmetrical axis of the rod.

---

This invention relates to a fishing rod and more particularly to a fishing rod having different flexural characteristics with different axes of symmetry.

Prior art fishing rods are essentially a hollow or solid tapered member having an essentially regular or symmetrical cross-section enabling it to flex or bend as a simple cantilever substantially equally in all directions relative to the longitudinal axis of the rod. When the line guides and the reel are mounted on the rod, the flexure of the rod remains substantially the same, when rotated, for a given bending moment, but there is one preferred or common axis of symmetry dictated by the position of the guides on the rod and the position of the reel. Torsional rotation of the rod occurs as tension is applied to the line at some angle relative to the rod tip when the reel and guides are rotated out of the plane of symmetry thereby generating a secondary torque since the line and the rod are not in the same plane of deflection.

It is a primary object of this invention to provide a fishing rod having different flexural characteristics with different axes of symmetry.

It is another object of this invention to provide a fishing rod having a reel mounting means selectively radially adjustable to a plurality of positions relative to the rod.

It is a further object of this invention to provide a fishing rod having a plurality of line guides each having a plurality of preferred line guiding positions.

It is a still further object of this invention to provide an improved line guiding means having a plurality of preferred line guiding portions.

It is another object of this invention to provide a reel mounting means selectively circumferentially positionable to a plurality of discrete positions relative to a fishing rod.

Briefly, according to the invention there is provided a fishing rod having a non-uniform cross-section, a plurality of line guiding means attached to the rod each having a plurality of preferred line guiding positions and a reel mounting means which is selectively circumferentially positionable for cooperation with any selected one of the preferred line guiding positions.

Thus it can be seen that the fishing rod of the present invention permits the rod and a reel to maintain an axis of symmetry for each plane of deflection with regard to the rod, line, reel, and line guides when the rod is rotated to any one of a plurality of preferred different positions about the longitudinal axis of the rod without restringing the line through the line guides or removing the reel from the rod.

The foregoing and other objects, features and advantages of the invention will be apparent from the following more particular description of a preferred embodiment of the invention, as illustrated in the accompanying drawings.

FIGURE 1 is a perspective view of a fishing rod and reel combination embodying the invention;

FIGURE 2 is a section view along lines A—A of FIGURE 1;

FIGURE 3 is an end view of the tip of the rod shown in FIGURE 1;

FIGURE 4 is a section view along the lines B—B of the rod and reel combination shown in FIGURE 1.

The fishing rod 10 embodying the invention comprises an elongated body portion 12 and a reel mounting portion 14. A plurality of line guiding means 16, 18 are spaced along the rod in suitable position to support and guide the line 20 from a suitable reel 22.

The body portion 12 is designed to provide a non-uniform or variable flexure property with angular position. One preferred structure for developing the variable flexure property is a body portion having a non-uniform cross-section. One embodiment is illustrated in FIGURE 2 in which the body portion has an elliptical cross-section. This shape provides two axes of symmetry, X—X and Y—Y. The flexure of the rod in the plane to axis X—X is substantially different from the flexure of the rod in the plane parallel to axis Y—Y. Other suitable methods can be used to develop a variable flexure property, for example, a non-uniform wall thickness, by an insert of a second material, or by a non-circular cross-section other than an ellipse.

To keep the line in the same plane as the plane of flexure of the rod and thereby avoid the problem of the secondary torque present in prior art rods, line guiding means are provided which have a plurality of preferred line guiding positions. In the embodiment shown in the drawing, a line guiding means 16 is provided having preferred line guiding portions 24, 26 which guide the line when the rod is flexed in a plane parallel to axis Y—Y. Preferred line guiding portion 28 is provided to guide the line when the rod is flexed in a plane parallel to axis X—X. In the same manner tip guide means 18 comprises preferred portions 30, 32 are provided to guide the line when the rod is flexed in the Y-axis direction and portion 34 is provided to guide the line when the rod is flexed in the X-axis direction. The line guide means may be made of any suitable material such as a curved portion spring steel attached at the ends by suitable filamentary materials, for example, and the preferred portions are formed as indentations therein at desired places intermediate the ends, thus providing inwardly curved portions between the line guiding portions.

The reel mounting means 14 provides selective relative circumferential movement of the reel relative to the body portion 12 of the rod for alignment with each of the preferred line guiding portions of the line guiding means. This is accomplished without removing the reel from the rod. In the embodiment shown in the drawings, reel mounting means 14 comprises an inner cylinder 36 rigidly attached to the rod. Means are provided such as upturned end portions 38 to retain a second cylindrical member 40 rotatably mounted over cylinder 36. Means such as nuts 42 are provided to attach a reel 22 to the mounting means. Means for selectively circumferentially positioning the member 40 with respect to body portion 12 of the rod is provided. Any suitable indexing means may be used. In the embodiment shown indexing means 44 provides the selective control of reel position. Indexing means 44 comprises a pivoted member 46 which has a locking portion 48. Locking portion 48 cooperates with a plurality of openings 50 in member 36 to lock the position of member 40. By depressing lever 46 and turning reel 22 relative to the rod, the reel can be rapidly and easily positioned at any of the preferred positions where an opening 50 is provided.

Although the fishing rod has been shown and described as comprising a one piece rod, it is obvious that the rod could be sectioned. In cases in which the rod is sectioned, it is desirable that the ferrules be shaped to provide proper alignment of the guides as the rod sections are coupled together.

While the invention has been particularly shown and described with reference to a preferred embodiment thereof, it will be understood by those skilled in the art that the foregoing and other changes in the form and details may be made therein without departing from the spirit and scope of the invention.

What I claim is:
1. A fishing rod comprising an elongated body portion and a reel mounting portion;
   said body portion having a non-uniform cross-section comprising a plurality of axes of symmetry;
   a plurality of line guide means spaced along said rod, each of said guide means having a plurality of preferred line guide portions comprising at least one portion of each of said axes of symmetry; each said guide means having inwardly curved portions between said guide portions; and
   means for selectively circumferentially positioning said reel mounting portion with respect to said body portion to align said mounting portion with the selected one of said preferred portions of said line guides.
2. A fishing rod comprising an elongated body portion comprising a plurality of axes of symmetry and a reel mounting portion;
   a plurality of line guide means spaced along said rod, each of said guide means having a plurality of preferred line guide portions including at least one preferred portion for each of said axes of symmetry; each said guide means having inwardly curved portions between said guide portions; and
   means for selectively circumferentially positioning said reel mounting portion with respect to said body portion to align said mounting portion with the selected one of said preferred portions of said line guides.
3. A fishing rod comprising an elongated body portion;
   said body portion having a non-uniform cross-section comprising a plurality of axes of symmetry; and
   a plurality of line guide means spaced along said rod, each of said guide means having a plurality of preferred line guide portions comprising at least one preferred portion for each of said axes of symmetry; each said guide means having inwardly curved portions between said guide portions.
4. A fishing rod comprising an elongated body portion and a reel mounting portion;
   said body portion having an elliptical cross-section comprising two axes of symmetry;
   a plurality of line guide means spaced along said rod, each of said guide means having a plurality of preferred line guide portions including at least one preferred portion for each of said axes of symmetry;
   each said guide means having inwardly curved portions between said guide portions; and
   means for selectively circumferentially positioning said reel mounting portion with respect to said body portion to align said mounting portion with the selected one of said preferred portions of said line guides.

References Cited
UNITED STATES PATENTS

| | | | |
|---|---|---|---|
| 235,513 | 12/1880 | Chubb | 43—22 |
| 1,073,260 | 9/1913 | Long | 43—18 |
| 2,537,488 | 1/1951 | Stoner | 43—18 |
| 3,058,255 | 10/1962 | Gorham | 43—24 |

SAMUEL KOREN, *Primary Examiner.*

J. H. CZERWONKY, *Assistant Examiner.*